United States Patent Office 2,983,748
Patented May 9, 1961

---

2,983,748
THIONOPHOSPHONIC ACID ESTERS

Hanshelmut Schlör, Wuppertal-Barmen, Ernst Schegk, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany No Drawing. Filed June 16, 1958, Ser. No. 741,999

Claims priority, application Germany June 24, 1957

5 Claims. (Cl. 260—461)

The present invention relates to and has as its objects new and useful thionophosphonic acid esters of the general formula

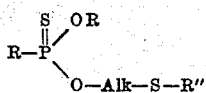

wherein R stands for a phenyl, chloro-substituted phenyl or lower alkyl radicals, R' for a low molecular weight alkyl radical, R" denotes a lower alkyl group, and Alk stands for a lower alkylene radical, and a process for their production.

Copending U.S. patent application Serial No. 550,481, now Patent No. 2,881,201, deals with inter alia some related phosphonic acid derivatives which differ from the above mentioned esters by the fact that the —Alk—S—R"— is attached to the phosphorus atom by S-linkage.

The compounds of the present invention are obtainable by reaction of thionophosphonic acid ester chlorides with correspondingly substituted mercapto alkanols. The reaction is preferably carried out in the presence of acid-binding agents, tertiary amines having proved to be particularly useful for binding the liberated hydrochloric acid. The use of organic solvents such as benzene, toluene, acetone, chloroform and the like has proved to be advantageous for carrying out the reaction. In order to obtain favourable results, the reaction is preferably first effected at low temperatures and then completed at room temperature or even at a slightly elevated temperature.

The new thionophosphonic acid esters are effective pest-control agents which in some cases distinguish themselves by a remarkably low toxicity. Some act on eating insects thus widening the range of their applicability. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

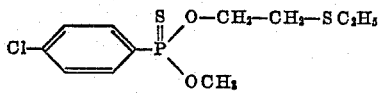

has been tested against caterpillars and spider mites.
Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out in the following manner:

(A) *Against caterpillars* (*Plutella maculipennis*).—Young white cabbage plants are sprayed drip wet with aqueous solutions of 0.1% as prepared above. Then the plants are infested with 10 to 20 caterpillars and sprayed again. Evaluation occurred after 24 hours, 48 hours and 96 hours, whereafter complete killing was obtained;

(B) *Against spider mites* (*contact-insecticidal action*).—Bean plants (*Phaseolus vulgaris*) of about 15 inches height are sprayed drip wet with 0.01% solutions as prepared above. The bean plants have been infested heavily with the two-spotted spider (species *Tetranychus telarius*). Evaluation has been carried out after 24 hours, 48 hours and 8 days. Total percentages of killed pests after 8 days 100%.

The following examples are given for the purpose of illustrating the present invention, but without, however, limiting it.

Example 1

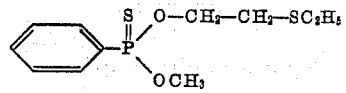

To 53 grams of β-thioethyl ethanol (½ mol) dissolved in 40 millilitres of anhydrous pyridine and 50 millilitres of chloroform are added with stirring at 5–15° C. 103 grams of phenyl thionophosphonic acid methyl ester chloride (B.P. 98–99° C./1 mm. Hg). The mixture is after-stirred at room temperature for 2 hours and then poured onto 100 grams of ice to which 2 millilitres of concentrated hydrochloric acid have been added. The mixture is diluted with 200 millilitres of benzene, washed twice with 100-millilitre portions of water, the benzenic layer is separated off and the solution thus obtained is dried over sodium sulfate. 116 grams of the new ester are thus obtained as a pale yellow water-insoluble oil. Yield: 84% of the theoretical. Toxicity on rats per os: 150 mg./kg. 0.1% solutions have a systemic action on aphids.

Example 2

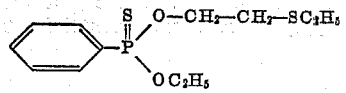

49 grams of β-thioethyl ethanol are dissolved in 37 grams of anhydrous pyridine and 50 millilitres of chloroform. 102 grams of phenyl-thionophosphonic acid ethyl ester chloride (B.P. 104–106° C./1.5 mm. Hg) are added dropwise with stirring at 5–15° C. and the mixture is after-stirred at room temperature for 2–4 hours. The product is then worked up as described in Example 1. 116 grams of the new ester are thus obtained as a colorless water-insoluble oil. Yield: 86% of the theoretical.

Toxicity on rats per os: 500 mg./kg. 0.1% solutions have a complete systemic action on aphids.

Example 3

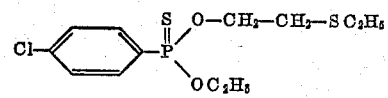

To 20 grams (0.2 mol) of β-thioethyl ethanol, 20 millilitres of benzene, 1 millilitre of water, 33 grams of potassium carbonate and ½ gram of copper powder, 51 millilitres (0.2 mol) of p-chlorophenyl-thionophosphonic acid ethyl ester chloride (B.P. 130–132° C./3 mm. Hg) are added dropwise at room temperature within 30 minutes. The mixture is after-stirred at 20–30° C. for two days, 50 millilitres of water and some kieselguhr are added, then filtered off with suction, washed with dilute aqueous ammonia and then with water, separated, dried and the solvent distilled off under vacuum. The residue is kept at a bath temperature of 60° C. under a pressure of 1 mm. Hg. Yield: 35 grams, i.e. 54% of the theoretical. Toxicity on rats per os: 100 mg./kg. 0.1% solutions kill aphids completely.

*Example 4*

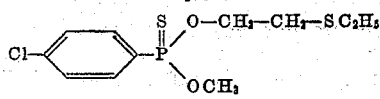

To 20 grams of β-thioethyl ethanol, 20 millilitres of benzene, 1 millilitre of water, 33 grams of potassium carbonate and 0.6 gram of copper powder there are added dropwise at room temperature within 30 minutes 48 grams of p-chlorophenyl-thionophosphonic acid methyl ester chloride (B.P. 125–128° C./2 mm. Hg). The mixture is stirred at room temperature for two days and then worked up as described in the preceding example. Yield: 33 grams, i.e. 53% of the theoretical. Toxicity on rates per os: 25 mg./kg. 0.1% solutions kill aphids and caterpillars completely. 0.01% solutions kill spider mites completely.

*Example 5*

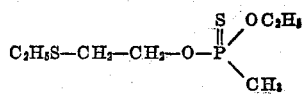

22 grams (0.2 mol) of β-ethylmercapto-ethyl thioether are dissolved with 16 grams (0.2 mol) of pyridine in 200 millilitres of benzene and to this solution there are added dropwise at 0–20° C. 34 grams (a little more than 0.2 mol) of methyl thionophosphonic acid-O-ethyl ester chloride. After briefly heating to 60° C. and prolonged standing at room temperature the product is filtered off with suction from pyridinium chloride, shaken with ice-water to which a few drops of concentrated hydrochloric acid have been added, the benzenic layer is separated off, dried over sodium sulfate and the solvent removed under vacuum. 45 grams of the new ester are thus obtained as a colorless liquor. The substance boils under a pressure of 0.01 mm. Hg at 63° C. Density: $d_4^{20}=1.114$; refraction: $n_D^{20}=1.5040$.

Toxicity on rats per os $LD_{50}$: 25 mg./kg. 0.1% solutions completely kill aphids. Spider mites are still killed with certainty by concentrations containing 0.01% of the ester. Moreover, the preparation shows a marked systemic action.

We claim:

1. A thionophosphonic ester of the general formula

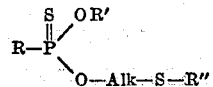

wherein R stands for a member selected from the group consisting of phenyl and chlorosubstituted phenyl, R' stands for a lower molecular weight alkyl radical, R" denotes a lower alkyl group, and Alk stands for a lower alkylene radical.

2. The thionophosphonic acid ester of the following formula

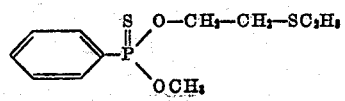

3. The thionophosphonic acid ester of the following formula

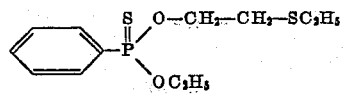

4. The thionophosphonic acid ester of the following formula

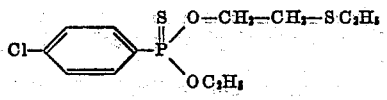

5. The thionophosphonic acid ester of the following formula

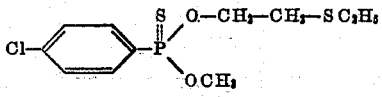

References Cited in the file of this patent

UNITED STATES PATENTS 2,594,454    Kosolapoff            Apr. 29, 1952
2,653,161    Ballard et al.          Sept. 22, 1953

FOREIGN PATENTS 823,293    Germany              July 8, 1949

OTHER REFERENCES

Razumov et al.: "Khim. i Primenenie Fosfororgan, Soedinenii Akad. Nauk S.S.S.R., Trudy 1-oi Konferents" (1955), pp. 205–217 (pub. 1957) (in Russian).

"Chem. Abst.," vol. 52, No. 1, col. 294f (1958).